United States Patent [19]

Ampferer

[11] Patent Number: 4,829,942
[45] Date of Patent: May 16, 1989

[54] INTAKE SYSTEM FOR A MULTI-CYLINDER INTERNAL-COMBUSTION ENGINE

[75] Inventor: Herbert Ampferer, Sachsenheim, Fed. Rep. of Germany

[73] Assignee: Dr. Ing. h.c.F. Porsche Aktiengesellschaft, Stuttgart, Fed. Rep. of Germany

[21] Appl. No.: 128,419

[22] Filed: Dec. 3, 1987

[30] Foreign Application Priority Data

Dec. 6, 1986 [DE] Fed. Rep. of Germany ....... 3641812

[51] Int. Cl.⁴ ............................................. F02B 75/18
[52] U.S. Cl. .............................. 123/52 MV; 123/432
[58] Field of Search ......... 123/52 M, 52 MB, 52 MC, 123/52 MV, 432, 308

[56] References Cited

U.S. PATENT DOCUMENTS

| 2,845,912 | 8/1958 | Bird . | |
|---|---|---|---|
| 4,066,058 | 1/1978 | Anderkay | 123/198 E |
| 4,317,438 | 3/1982 | Yagi et al. | 123/432 |
| 4,726,337 | 2/1988 | Yoshida | 123/52 M |
| 4,726,340 | 2/1988 | Hasegawa et al. | 123/52 M |

FOREIGN PATENT DOCUMENTS

| 0054964 | 6/1982 | European Pat. Off. . | |
|---|---|---|---|
| 0223378 | 5/1987 | European Pat. Off. . | |
| 2339356 | 3/1975 | Fed. Rep. of Germany . | |
| 2744039 | 4/1979 | Fed. Rep. of Germany . | |
| 0150515 | 11/1979 | Japan | 123/52 M |
| 56-101055 | 8/1981 | Japan . | |
| 0070947 | 5/1982 | Japan | 123/52 M |
| 0119958 | 7/1983 | Japan | 123/52 M |
| 0043923 | 3/1984 | Japan | 123/52 M |

Primary Examiner—David A. Okonsky
Attorney, Agent, or Firm—Barnes & Thornburg

[57] ABSTRACT

The intake system is connected to a cylinder head of the internal-combustion engine that, for each cylinder, has two intake ducts. The intake ducts are located on a joint plane extending vertically with respect to the cylinder bore axis. A curve-shaped pipe body piece of the intake system leads away from the cylinder in which the ducts are continued and have an interlaced course with respect to one another. This course is developed in such a way that, in a horizontal plane extending away from the cylinder head, the ducts are located next to one another—seen in transverse direction of the internal-combustion engine.

25 Claims, 4 Drawing Sheets

INTAKE SYSTEM FOR A MULTI-CYLINDER INTERNAL-COMBUSTION ENGINE

BACKGROUND OF THE INVENTION

The invention relates to an intake system for a multi-cylinder internal-combustion engine, preferably of a passenger car, that for each cylinder has two intake valves respectively and two intake ducts that are separated at least in sections, the intake ducts that form the component of a cylinder head being arranged on a joint plane extending vertically to a cylinder bore axis and being connected to the intake system.

In the case of a known intake system (EP-PS 00 54 964) of the initially mentioned type, the intake ducts extend in the cylinder head and the ducts in the suction pipe that are connected to them extend vertically with respect to the longitudinal center plane of the internal-combustion engine. This construction makes the designing of the suction pipe difficult in the case of narrow cylinder distances of internal-combustion engines or in the case of internal-combustion engines having, for example, V-shaped banks of cylinders. In addition, the different lengths of the ducts are hard to implement in the suction pipe.

It is an objective of the invention to provide an intake system that is held at an internal-combustion engine and that, while functioning well, has dimensions that are advantageous with respect to space.

This objective is achieved according to the invention by providing pipe body pieces for each cylinder which connect respective pairs of inlet ducts at the engine cylinder head with an inlet manifold system, with the ducts curved and interlaced with one another in the pipe body pieces so that the duct ends opposite the cylinder head are disposed adjacent one another in a connecting plane for connecting to the manifold system.

In preferred embodiments the pipe body pieces are identical to one another and are connected by screws to a common manifold member for a bank of engine cylinders.

The main advantages achieved by means of the invention are that by means of the interlaced course of the ducts in the pipe body piece, the intake system—seen in longitudinal direction of the internal-combustion engine—required little space which is important particularly for internal-combustion engines having cylinder banks that extend in a V-shape. The separate pipe body pieces simplifies the manufacturing of the intake system. The ducts of the intake system manifold that have a varying length can be integrated into the intake system in a simple way.

The intake system of the invention is especially suitable for internal-combustion engines having V-shaped banks of cylinders that are installed transversely in the front end of a passenger car, a significant partial area of the intake system extending adjacent to a cap of the rear bank of cylinders. As a result, the space between the internal-combustion engine and the body of a passenger car is utilized well. In addition, the passage ducts in the intake system ensure that spark plugs of the internal-combustion engine are accessible without demounting the intake system. Finally, the vibration-neutralized bearing of the intake system contributes to the nose reduction of the internal-combustion engine.

Other objects, advantages and novel features of the present invention will become apparent from the following detailed description of the invention when considered in conjunction with the accompanying drawings.

DETAILED DESCRIPTION OF THE DRAWINGS

Figure 1:
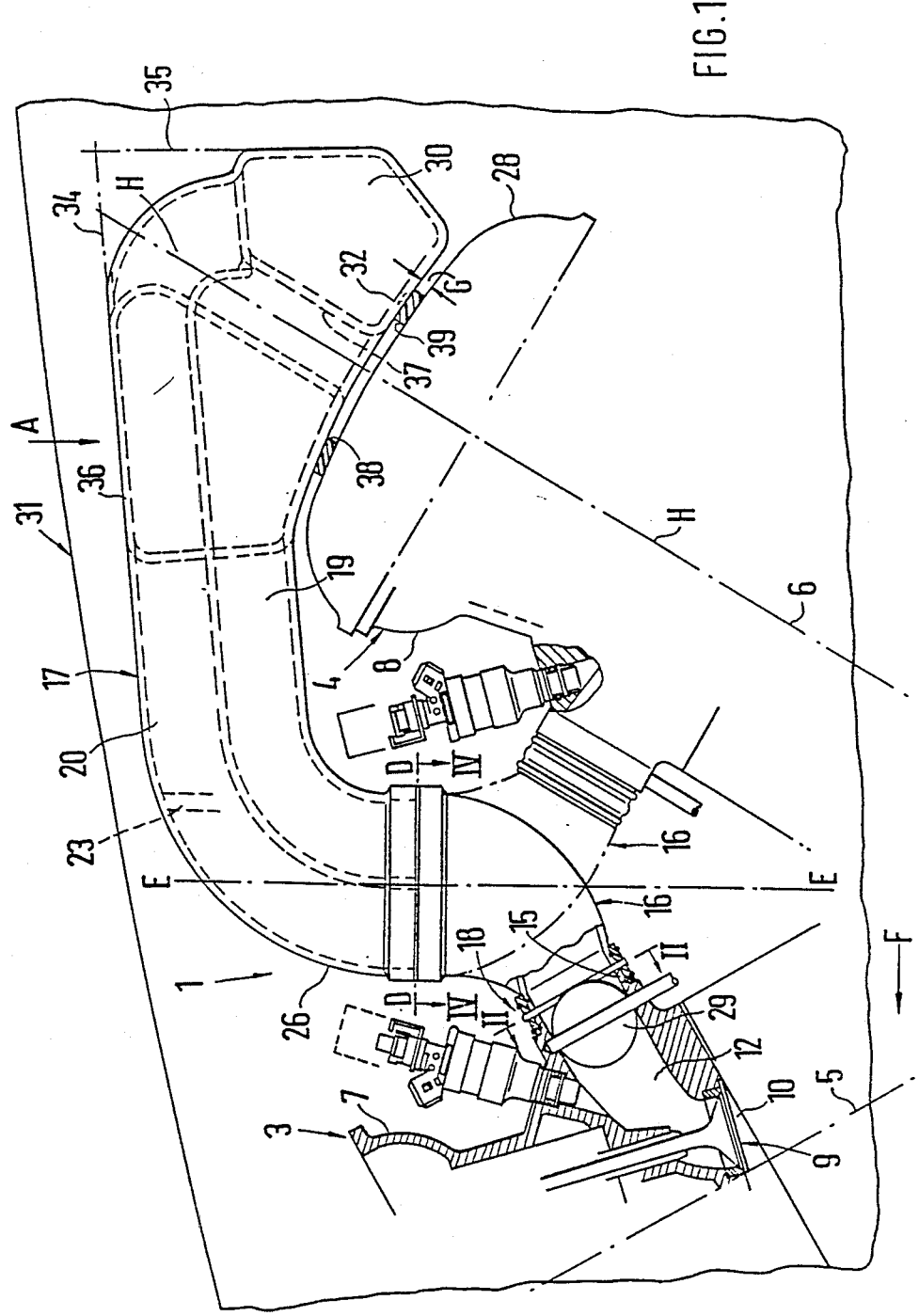
FIG. 1 is a partial sectional schematic view of an internal-combustion engine, seen from the direction of a front end and equipped with an intake system constructed in accordance with a preferred embodiment of the invention.

A multi-cylinder internal-combustion engine 1 comprises two banks 3, 4 of cylinders, the central cylinder axes 5, 6 of which are arranged in a V-shape with respect to one another. The banks 3, 4 of cylinders have cylinder heads 7, 8 that for each cylinder are equipped with two intake valves 9, in which case the intake valves 9 control gas currents to a combustion chamber 10 that reach the combustion chamber 10 via two separate intake ducts 11, 12. The intake ducts 11, 12 are a component of the cylinder head 7 and, with inlet openings 13, 14, are disposed on a joint plane B—B that extends in parallel to a longitudinal center axis of the crankshaft that is not shown and extends vertically with respect to a longitudinal center axis C—C of the cylinder. Pipe sockets 15 lead laterally out of the cylinder head 7 and are extensions of the intake ducts 11, 12 and are connected to pipe body pieces 16 of an intake system 17, namely by means of sleeve-type connecting elements consisting of an elastic material.

Figure 4:
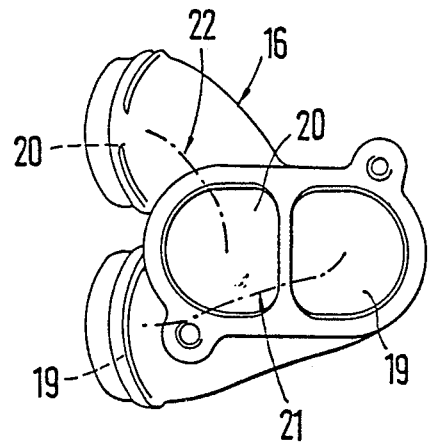
FIG. 4 is an enlarged sectional view taken along Line IV—IV of FIG. 1.
Figure 3:
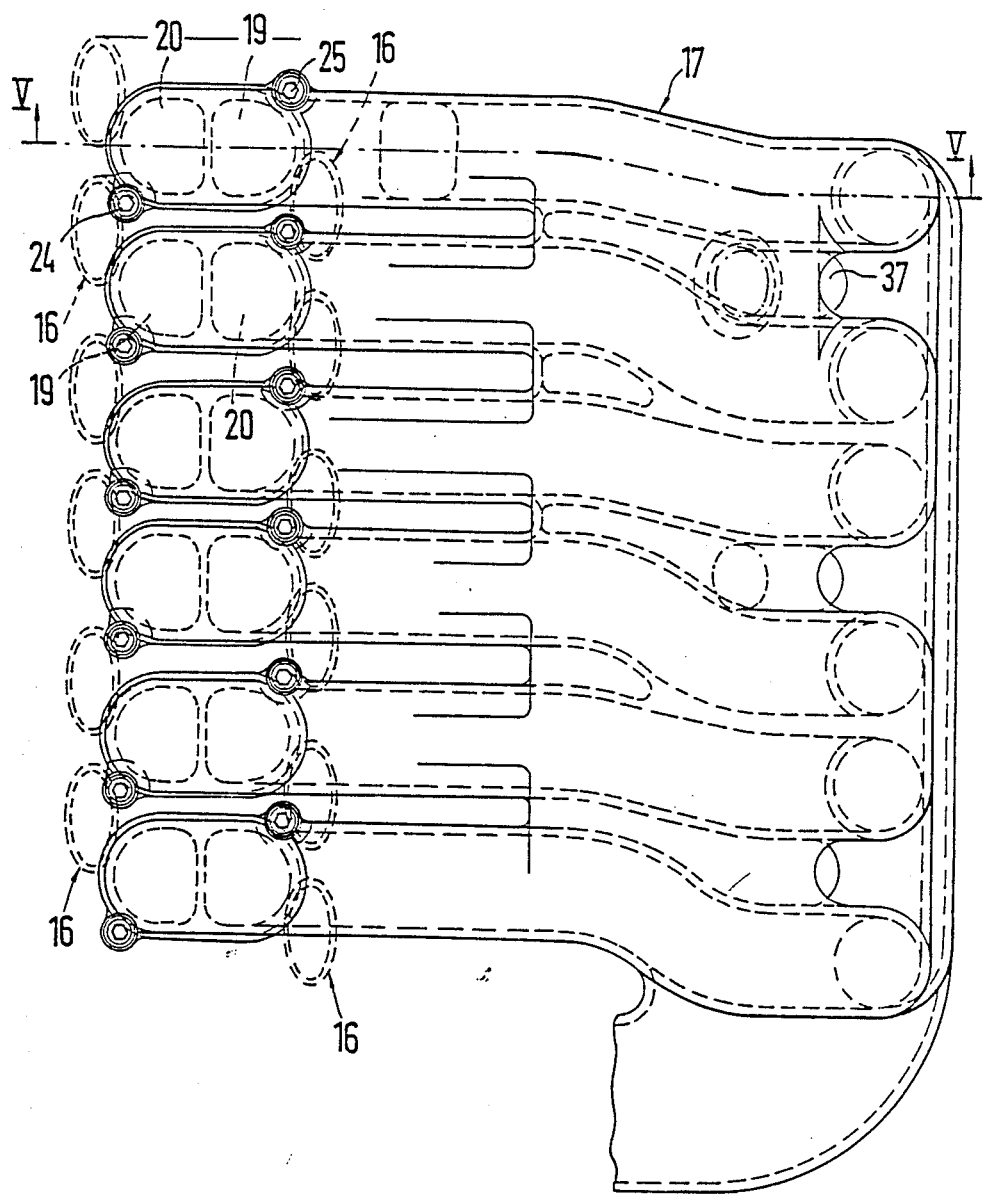
FIG. 3 is a view taken in the direction of the Arrow A of FIG. 1.

In the pipe body pieces 16 that lead away from the cylinder head 7 in a curved way, separate ducts 19, 20 are continued that have an interlaced course—see center axes 21, 22 of ducts 19, 20 of FIG. 4. The interlaced course of the ducts 19, 20 is designed in such a way that they—seen in transverse direction of the internal-combustion engine 1—are disposed next to one another in a horizontal plane D—D of the pipe body piece 16 that is located away from the cylinder head 7 or 8 (FIG. 1 and 4). In other words, the ducts 19, 20 have a varying distance from the cylinder heads 7, 8.

For each cylinder, one pipe body piece 16 is provided that extends between the cylinder head 7 or 8 and the plane D—D and is manufactured separately from a manifold part 23 of the intake system 17. The pipe body piece 16 is connected with the part 23 by means of screws 24, 25. In addition, it is developed in such a way that it can be used as the same part for the different cylinders of both banks 3, 4 of cylinders.

Figure 2:
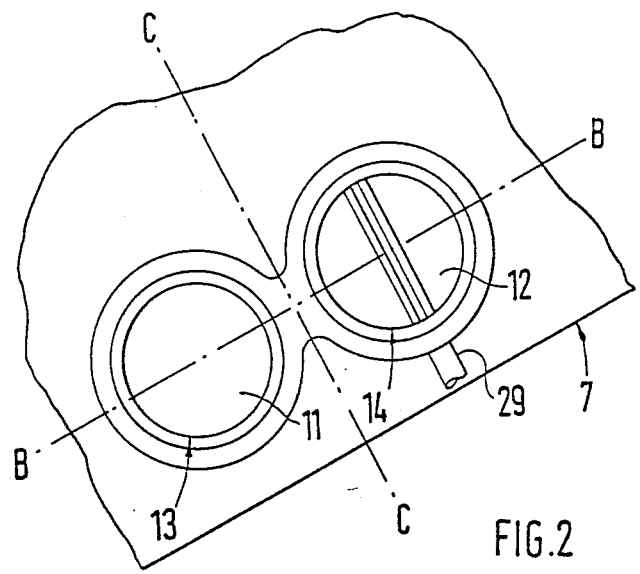
FIG. 2 is an enlarged sectional view taken along Line II—II of FIG. 1.
Figure 5:
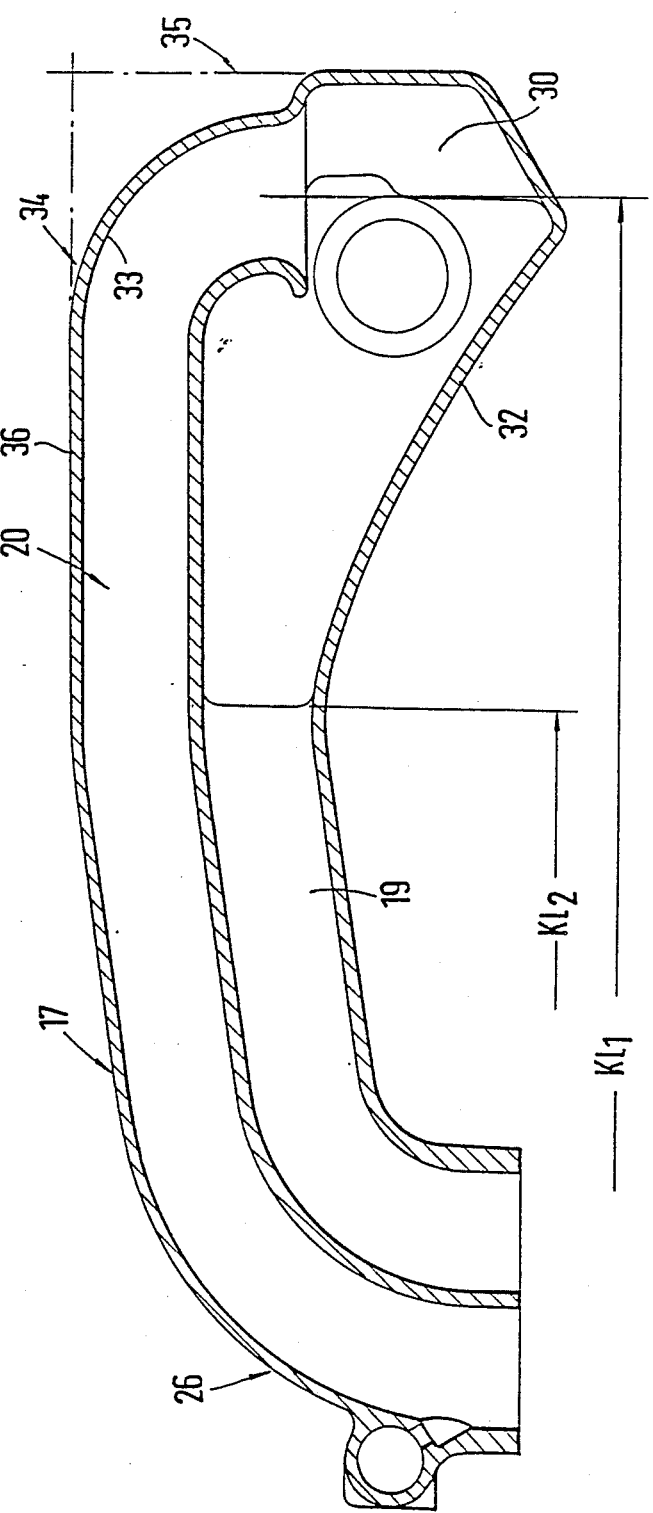
FIG. 5 is an enlarged sectional view taken along Line V—V of FIG. 3.

Following the pipe body pieces 16, the intake system 17 has a pipe bend 26 in part 23 whereby the separate ducts 19, 20 are deflected. They therefore extend above one another in a section that is located transversely to the internal-combustion engine. In order to increase the torque of the internal-combustion engine 1, the ducts 19, 20, in the case of defined operating conditions, have different lengths -$Kl_1$ and $Kl_2$ - (FIG. 5). In this case, the longer duct 20 extends away from a cap 28 that covers the cylinder head 8; i.e., in the case of the conventional installing position of an internal-combustion engine (=the cylinders are upright), duct 20 extends above duct 19. The shorter duct 19—K1$_2$—is closed during a low rotational speed of the internal-combustion engine and is opened during a higher rotational speed, by means of control flap 29 in the cylinder head 7—FIG. 1 and 2. Both ducts 19 and 20 lead into a distributor space 30 that is integrated in the intake manifold part 23 of the intake system 17.

According to FIG. 1, the internal-combustion engine 1 is installed transversely into the front end of a passenger car that is not shown in detail, namely in such a way that the banks 3, 4 of cylinders extend at the same angle with respect to a vertical transverse plane E—E of the passenger car, in which case, seen in driving direction F of the passenger car, bank 3 of the cylinders is located in front and bank 4 of the cylinders is located in the rear. The intake system 17—seen in transverse direction of the internal-combustion engine 1—extends above the rear bank 4 of cylinders in order to utilize the space between bank 4 of cylinders and a contour 31 (engine hood) of the body. In this case, the intake system manifold part 23, with a first wall 32, in sections, extends at a narrow distance G with respect to the cap 28. Above the first wall 32, a second wall 33 is located that has a roof-shaped course that is determined by lines 34, 35. A wall section 36, that is defined by line 34, extends adjacent to the contour 31 of the body.

Bank 4 of the cylinders has one spark plug per cylinder—not shown—that is arranged in a central longitudinal plane H—H of the internal-combustion engine and is accessible via the cap 28. So that, for a testing or exchanging of the spark plug, the intake system 17 does not have to be demounted, a passage duct 37 is provided in it in the area of the spark plug.

In addition, the intake system 17 is held at the internal-combustion engine 1 so that it is neutralized with respect to vibrations. For this purpose, part 23 is, on one side, connected by means of the connecting elements 18, with the internal-combustion engine and, on the other side, supports itself at said engine by means of elastic elements 38, 39.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An intake system for a multi-cylinder internal-combustion engine having a longitudinal axis and of the type having two intake valves for each cylinder, each intake valve disposed in respective separate and adjacent intake ducts for each cylinder, said intake ducts extending in an engine cylinder head, said intake system comprising:
   a unitary pipe body piece leading from the cylinder head and including a pair of body piece ducts for communicating inlet gases from an intake system distribution manifold means to the respective separate and adjacent intake ducts for at least one of the cylinders in the engine cylinder head, said body piece ducts extending over respective different and interlaced curved paths each from different and adjacent cylinder head intake duct openings to respective connection openings disposed adjacent one another in a substantially horizontal connection plane spaced from the engine cylinder head and transverse to the longitudinal axis of the internal-combustion engine.

2. An intake system according to claim 1, further comprising intake system manifold means manufactured separately from the pipe body piece and attached to the pipe body piece at detachable connection means.

3. An intake system according to claim 2, wherein a plurality of said pipe body pieces are provided, one each for each of the engine cylinders, said pipe body pieces being identical to one another and being connected to said intake system manifold means at respective connection planes.

4. An intake system according to claim 2, wherein the intake manifold means is a unitary member which has a pipe bend, upstream from the pipe body piece, configured in such a way that the pair of body piece ducts are connected to a pair of separate intake manifold ducts which extend adjacent to and above one another in a section of the manifold means that extends transversely with respect to the crankshaft longitudinal direction of the internal-combustion engine.

5. An intake system according to claim 2, wherein the separate manifold ducts have varying lengths through the manifold means, and wherein the longer duct extends away from a cap of the internal-combustion engine.

6. An intake system according to claim 5, wherein the separate manifold ducts lead into a distributor space of the intake manifold means.

7. An intake system according to claim 1, the intake system being assigned to the internal-combustion engine having banks of cylinders that extend in a V-shape with respect to one another, and the internal-combustion engine being installed transversely in the front end of a passenger car in such a way that the banks of cylinders extend at the same angle with respect to a vertical transverse plane of the passenger car, wherein as seen in transverse direction of the internal-combustion engine, the intake system manifold means, with a first wall, extends at a narrow distance with respect to a cap of the cylinder head of the rear bank of cylinders, a second wall extending in an approximately roof-shaped way above the first wall.

8. An intake system according to claim 7, that is assigned to the internal-combustion engine having spark plugs that are arranged in a central longitudinal plane of the cylinders and are accessible via recesses in the cap, wherein the intake system manifold means has passage ducts for accommodating exchange of spark plugs without removal of the intake system manifold means.

9. An intake system according claim 2, wherein the intake system manifold means is held at the internal-combustion engine so that it is neutralized with respect to vibrations, sleeve-type connecting elements made of an elastic material being provided between the pipe body pieces and a socket of the cylinder head, and wherein said intake system manifold means supports itself by means of elastic elements at the internal-combustion engine.

10. An intake system according claim 2, wherein the intake system manifold means is constructed as a unitary member with pairs of intake ducts for each of a plurality of engine cylinders; wherein a plurality of said pipe body pieces are provided, one each for each cylinder, said pipe body pieces being detachably attached to the intake manifold means at respective connection planes.

11. An intake system according claim 10, wherein respective pairs of said intake ducts extend through the intake system manifold means with respective common separating walls along most of their length.

12. An intake system according claim 11, wherein said intake system manifold includes a common air inlet chamber which opens into all the respective ducts.

13. An intake system according claim 2, wherein said intake system manifold means includes a distribution space which communicates with the pairs of ducts extending therein, and wherein the ducts of each pair exhibit different lengths between the distribution space and the cylinder head, the shorter of said ducts being controlled by valve means to be selectively opened and closed during engine operations.

14. An intake system for a multi-cylinder internal-combustion engine having a longitudinal axis and of the type having two intake valves for each cylinder, each intake valve disposed in respective separate and adjacent intake ducts for each cylinder which extend in an engine cylinder head, the internal-combustion engine having banks of cylinders that extend in a V-shape with respect to one another, and the internal-combustion engine being installed transversely in the front end of a passenger car in such a way that the banks of cylinders extend at the same angle with respect to a vertical transverse plane of the passenger car to provide front and rear banks of cylinders, the intake system comprising:

a unitary pipe body piece leading from the cylinder head and including a pair of body piece ducts for communicating inlet gases from an intake system distribution manifold means to the respective separate and adjacent intake ducts for at least one of said cylinders in the engine cylinder head, said body piece ducts extending over respective different and interlaced curved paths each from different and adjacent cylinder head intake duct openings to respective connection openings disposed adjacent one another in a substantially horizontal longitudinal connection plane spaced from the engine cylinder head and transverse to the longitudinal axis of the internal-combustion engine, and wherein as seen in transverse direction of the internal-combustion engine, the intake system manifold means has a first wall, extending at a narrow distance with respect to a cap of the cylinder head of the rear bank of cylinders and a second wall extending in an approximately roof-shaped way above the first wall.

15. An intake system according to claim 14, further comprising intake system manifold means manufactured separately from the pipe body piece and attached to the pipe body piece at detachable connection means.

16. An intake system according to claim 15, wherein a plurality of said pipe body pieces are provided, one each for each of the engine cylinders, said pipe body pieces being identical to one another and being connected to said intake system manifold means at respective connection planes.

17. An intake system according to claim 15, wherein the intake manifold means is a unitary member which has a pipe bend, upstream from the pipe body piece, configured in such a way that the pair of body piece ducts are connected to a pair of separate intake manifold ducts which extend adjacent to and above one another in a section of the manifold means that extends transversely with respect to the crankshaft longitudinal direction of the internal-combustion engine.

18. An intake system according to claim 15, wherein the separate manifold ducts having varying lengths through the manifold means, and wherein the longer ducts extend away from a cap of the internal-combustion engine.

19. An intake system according to claim 18, wherein the separate manifold ducts lead into a distributor space of the intake manifold means.

20. An intake system according to claim 14, that is assigned to the internal-combustion engine having spark plugs that are arranged in a central longitudinal plane of the cylinders and are accessible via recesses in the cap, wherein the intake system manifold means has passage ducts for accommodating exchange of spark plugs without removal of the intake system manifold means.

21. An intake system according to claim 15, wherein the intake system manifold means is held at the internal-combustion engine so that it is neutralized with respect to vibrations, sleeve-type connecting elements made of an elastic material being provided between the pipe body pieces and a socket of the cylinder head, and wherein said intake system manifold means supports itself by means of elastic elements at the internal-combustion engine.

22. An intake system according to claim 15, wherein the intake system manifold means is constructed as a unitary member with pairs of intake ducts for each of a plurality of engine cylinders; wherein a plurality of said pipe body pieces are provided, one each for each of the cylinders, said pipe body pieces being detachably attached to the intake manifold means at respective connection planes.

23. An intake system according claim 22, wherein respective pairs of said intake ducts extend through the intake system manifold means with respective common separating walls along most of their length.

24. An intake system according claim 23, wherein said intake system manifold includes a common air inlet chamber which opens into all the respective ducts.

25. An intake system according claim 15, wherein said intake system manifold means includes a distribution space which communicates with the pairs of ducts extending therein, and wherein the ducts of each pair exhibit different lengths between the distribution space and the cylinder head, the shorter of said ducts being controlled by valve means to be selectively opened and closed during engine operations.

* * * * *